United States Patent [19]

Stoll

[11] 4,294,164
[45] Oct. 13, 1981

[54] PISTON FOR USE IN PNEUMATICALLY OPERATED PISTON-CYLINDER APPARATUS

[76] Inventor: Kurt Stoll, Lenzhalde 72, 7300 Esslingen, N., Fed. Rep. of Germany

[21] Appl. No.: 100,068

[22] Filed: Dec. 4, 1979

[30] Foreign Application Priority Data

Dec. 14, 1978 [DE] Fed. Rep. of Germany ... 7836994[U]

[51] Int. Cl.³ .............................................. F16J 9/08
[52] U.S. Cl. ..................................... 92/243; 92/251
[58] Field of Search ......................... 92/243, 244, 251

[56] References Cited

U.S. PATENT DOCUMENTS

| | | | |
|---|---|---|---|
| 1,577,732 | 3/1926 | Lamb | 92/243 X |
| 2,402,268 | 6/1946 | Young | 92/244 |
| 3,319,537 | 5/1967 | Pittman | 92/243 X |
| 4,205,595 | 6/1980 | Hafner et al. | 92/243 |

Primary Examiner—Irwin C. Cohen
Attorney, Agent, or Firm—Blanchard, Flynn, Thiel, Boutell & Tanis

[57] ABSTRACT

A piston for use in pneumatically operated piston-cylinder apparatus has a disc-shaped steel core for connection with a piston rod, a sealing ring of resilient material surrounding the core and having an integral sealing lip extending from each axial end an incomplete guide ring fitted around the sealing ring. The guide ring is formed of a graphite-filled plastics material and embraces a circumferential surface of the sealing ring to be axially fixed but radially resilient relative to the piston core.

4 Claims, 3 Drawing Figures

PISTON FOR USE IN PNEUMATICALLY OPERATED PISTON-CYLINDER APPARATUS

FIELD OF THE INVENTION

The invention relates to pistons for use in pneumatically operated piston-cylinder apparatus.

BACKGROUND OF THE INVENTION

With a piston of the type which comprises a cylindrical steel core, for example of disc form, connected with a piston rod and, fitted to this core, a sealing ring with sealing lips, formed integrally of rubber or a plastics material similar to rubber having good sealing properties, it is not only necessary to ensure that the piston is accurately controlled during its reciprocal movements inside a cylinder but it must also be ensured that a reliable seal is provided between the piston and the cylinder walls which guide the piston, because the chambers on either side of the piston must be well sealed against each other. Known assemblies which are comparable to the above fail to provide an optimum solution of the problem and are moreover relatively expensive.

According to the present invention there is provided a piston especially for pneumatic cylinders, comprising a rigid core connectable with a piston rod, a sealing ring mounted on the core and having integrally formed sealing lips, the sealing ring being formed of rubber or a plastics material having sealing properties similar to rubber, and a guide ring which is fitted around the sealing ring and is formed of a slideable plastics material to be axially fixed and radially resilient relative to the core.

Preferably the guide ring is slotted and the cross-section of the guide ring is of the shape of a letter C turned into a horizontal position. Preferably also the sealing ring has a circumferential surface and a transverse member of the guide ring extends parallel to the circumferential surface, two legs, of the guide ring embracing the circumferential surface of the sealing ring from opposite sides. It is particularly advantageous that the guide ring is formed of a graphite-filled plastics material, preferably of the polyamide group.

Further the core may have a plurality of cut-outs which are uniformly arranged around the circumference of the core, are of a substantially arcuate contour, and open externally so that the material of the sealing ring may engage with the core from externally. The circumference of the core may be completely covered by the material of the sealing ring, the thickness of the covering being greater in the regions of the cut-outs than in the regions therebetween.

BRIEF DESCRIPTION OF THE DRAWING

An embodiment of the present invention will now be described by way of example only with reference to the accompanying drawing, in which.

DETAILED DESCRIPTION

Figure 1:
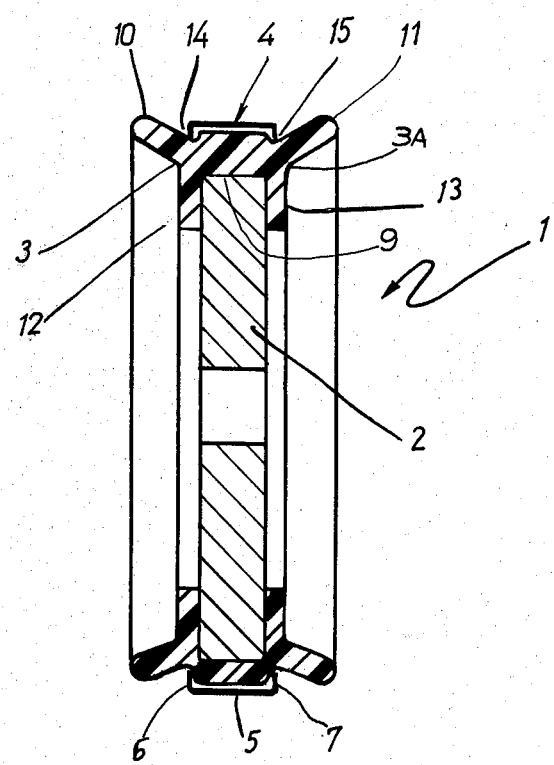
FIG. 1 is an axial sectional elevation through a piston according to the invention.
Figure 2:
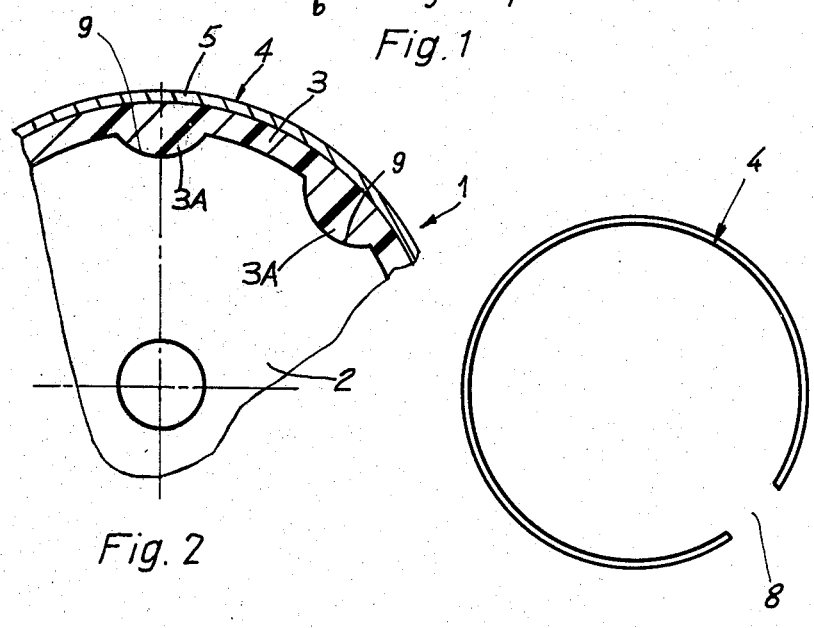
FIG. 2 shows part of the piston according to FIG. 1 in a front view with the sealing ring and guide ring being sectioned.

Referring to the drawing, a piston which is especially designed for pneumatically operated cylinders, is referred to in a general way, by reference number 1. It comprises a cylindrical core 2, preferably of steel, which is connected with a piston rod (not shown), and which, in the embodiment shown in the drawing, is disc shaped. A sealing ring 3 with integral sealing lips 10, 11, is formed of an elastic rubber or a plastics material similar to rubber, and is fitted over the core 2. The sealing ring 3 is, as a rule, moulded onto the piston core 2 and the two annular sealing lips 10, 11, are formed onto its axially opposite ends from where they extend in opposite directions, each lip being outwardly inclined relative to the respective axial end of the disc. With the aid of these sealing lips the piston is reliably sealed in use against a cylinder, chambers defined on either side of the piston thereby being reliably isolated from each other. The steel core 2 is securely covered in the region of its outermost edge by flange parts 12, 13 of the sealing ring 3.

Figure 3:
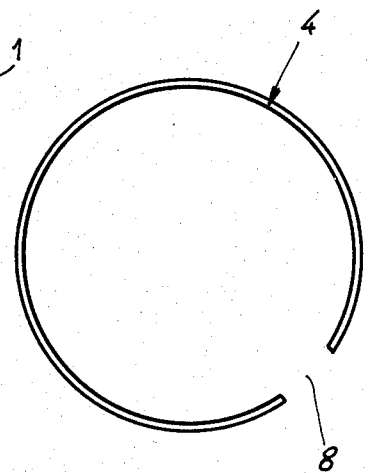
FIG. 3 is a schematic presentation of a guide ring used with the assembly according to FIG. 1, in a front view.

The piston is controlled with the aid of a guide ring 4 which is fitted over the sealing ring 3 whereby the latter is resiliently supported while fixed in the axial direction relative to the piston. The guide ring 4 is manufactured from a slidable plastics material of sufficient strength, for example from a graphite-filled plastics material preferably of the group of polyamides. In order to ensure that the guide ring 4 is resiliently supported on the sealing ring 3, the ring 4 slotted as shown in the drawing at reference point 8 (see FIG. 3). The resilience of the system is augmented by the fact that the sealing ring 3 supporting the guide ring 4 is manufactured from a resilient material. To fix the guide ring 4 in the axial direction its cross-section is of the shape of a channel or letter C turned into a horizontal position as indicated in FIG. 1. The transverse member or bight portion 5 of the letter C thereby extends parallel to the circumferential surface of the disc shaped piston, and the two legs 6, 7 surround the piston in the region of its circumferential edge on the two opposite sides, where the legs 6, 7 engage with recesses 14 and 15 in the sealing ring 3.

With these arrangements the guide ring 3 is securely held and fixed in the axial direction relative to the piston, complementing thereby the favourable effect of the arrangement on a troublefree assembly of the various parts.

As mentioned hereinbefore the guide ring 4 is resiliently supported, its internal circumference encircling part of the sealing ring 3 which is made of a resilient material. The disc-shaped steel core 2 of the piston has several, for example 10 to 12 cut-outs 9 uniformly spaced around its circumference, which are substantially arcuate and open externally so that the material 3A of the sealing ring 3 may project into the steel core 2 from externally, as is indicated at the top of FIG. 1. The external circumference of the disc which constitutes the steel core 2 of the piston is completely surrounded by the material of the sealing ring 3, the thickness of the covering layer being greater in the regions of said cut-outs 9 than in the regions between the latter. To a certain extent this feature is a result of the manufacturing method and it is partly due to the fact that the resilient sealing ring 3 provides a springy support for the guide ring 4.

The piston is therefore designed on simple lines, is correspondingly easy to assemble, and not only guarantees a perfect seal between the piston and the cylinder walls which control its movements but also guarantees that friction does not become excessive during this control of the piston movements.

The piston assembly offers the advantage of controlling the piston movements inside the cylinder in a perfect manner without increasing the friction between the piston and the cylinder walls beyond a moderate value which is smaller than that of known comparable assemblies. Construction is simple, it is easy to assemble the structural components and the manufacturing costs are correspondingly low. However, despite its simple design the seal between the piston and the cylinder walls is reliably pressure tight. Summarising, a piston is provided which takes advantage of the principle of mounting in a resilient manner a sealing ring which adjusts itself to wear and fluctuating pressures and in addition to this is capable of equalising even major cylinder tolerances. The weight of the guide ring, which may be exclusively manufactured of plastics materials, is light, and the damping work which has to be produced at the end of a stroke is moderate. It is due to the extensive control areas on the piston surface, the slidable material and the special design of the sealing system that friction is considerably reduced. This makes it seem justifiable to take lubrication-free operation into consideration. The good sealing functions are not diminished by the above.

The additional advantage of this arrangement is that moderate structural costs are combined with a relatively simple design, which means that no difficulties arise from the assembly of parts. Once the sealing ring is spray-moulded on to the steel core of the piston it is easy for the guide ring to be resiliently fitted over the sealing ring.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A piston for operating cylinders which are to be operated utilizing compressed air, comprising:
   a rigid cylindrical core member adapted to be connected to a piston rod;
   an annular sealing ring of elastic material mounted around and completely enclosing the peripheral edge of said core, said sealing ring having a pair of radially inwardly and axially spaced flange parts tightly engaging opposite axially facing sides of said core, said sealing ring further having a central web member integrally connecting the radially outer extremity of said flange parts and tightly engaging the radial periphery of said core, said sealing ring further having a pair of annular sealing lips integrally connected at the juncture between each flange part and said central web member and at a location spaced radially inwardly from the radially outermost extremity of said central web member to thereby define first and second radially outwardly opening, axially spaced recesses, each of said sealing lips being outwardly inclined relative to the axially facing sides of said core and terminating at a location whereat the diameter is of greater dimension than the diameter of said central web member; and
   a resilient annular guide ring having a generally channel-shaped cross section having a central bight portion and a pair of axially spaced legs, each of said axially spaced legs being received in a respective one of said first and second recesses to thereby prevent said guide ring from moving axially relative to said sealing ring, said guide ring being slotted to facilitate an installation of said guide ring on said sealing ring.

2. A piston according to claim 1, wherein said guide ring is formed of a graphite-filled plastics material of the polyamide group.

3. A piston according to claim 1, wherein said core has a plurality of cut-outs which are uniformly spaced around the circumference of said core, are of a substantially arcuate contour, and open radially outwardly, said sealing ring having radially inwardly projecting tabs received in said cut-outs.

4. A piston according to claim 1, wherein said sealing ring is moulded around said core.

* * * * *